United States Patent

[11] 3,629,919

[72] Inventor David J. Trevarrow, Jr.
3864 Tyrconnel Trail, Orchard Lake, Mich. 48033
[21] Appl. No. 858,676
[22] Filed Sept. 17, 1969
[45] Patented Dec. 28, 1971

[54] TOOL AND TOOL HOLDER ASSEMBLY
2 Claims, 4 Drawing Figs.

[52] U.S. Cl. ........................................... 29/96
[51] Int. Cl. ........................................... B26d 1/00
[50] Field of Search ............................... 29/96

[56] References Cited
UNITED STATES PATENTS

| | | | |
|---|---|---|---|
| 2,877,535 | 3/1959 | Williams | 29/96 |
| 3,121,939 | 2/1964 | Williams | 29/96 |
| 3,124,866 | 3/1964 | Novkov | 29/96 |
| 3,132,542 | 5/1964 | Horvath | 29/96 X |
| 3,214,825 | 11/1965 | Williams | 29/96 |

*Primary Examiner*—Harrison L. Hinson
*Attorney*—Harness, Dickey & Pierce

ABSTRACT: A combination tool and tool holder assembly, the tool holder member of which comprises upper and lower sides and converging edge portions which define a tool support section; a tool member adapted for operative support on the tool support section and having one or more cutting portions adapted to overlie the converging edge portions thereof so as to project outwardly therefrom for engagement with a workpiece to be machined; means for operatively securing the tool member on the tool holder member, and means for resisting rotational, transverse and longitudinal movement of the tool member relative to the tool holder member including a generally channellike recess formed on one side of one of the members and a complementary shaped embossed portion formed on the confronting side of the other of the members adapted for operative engagement with the recess.

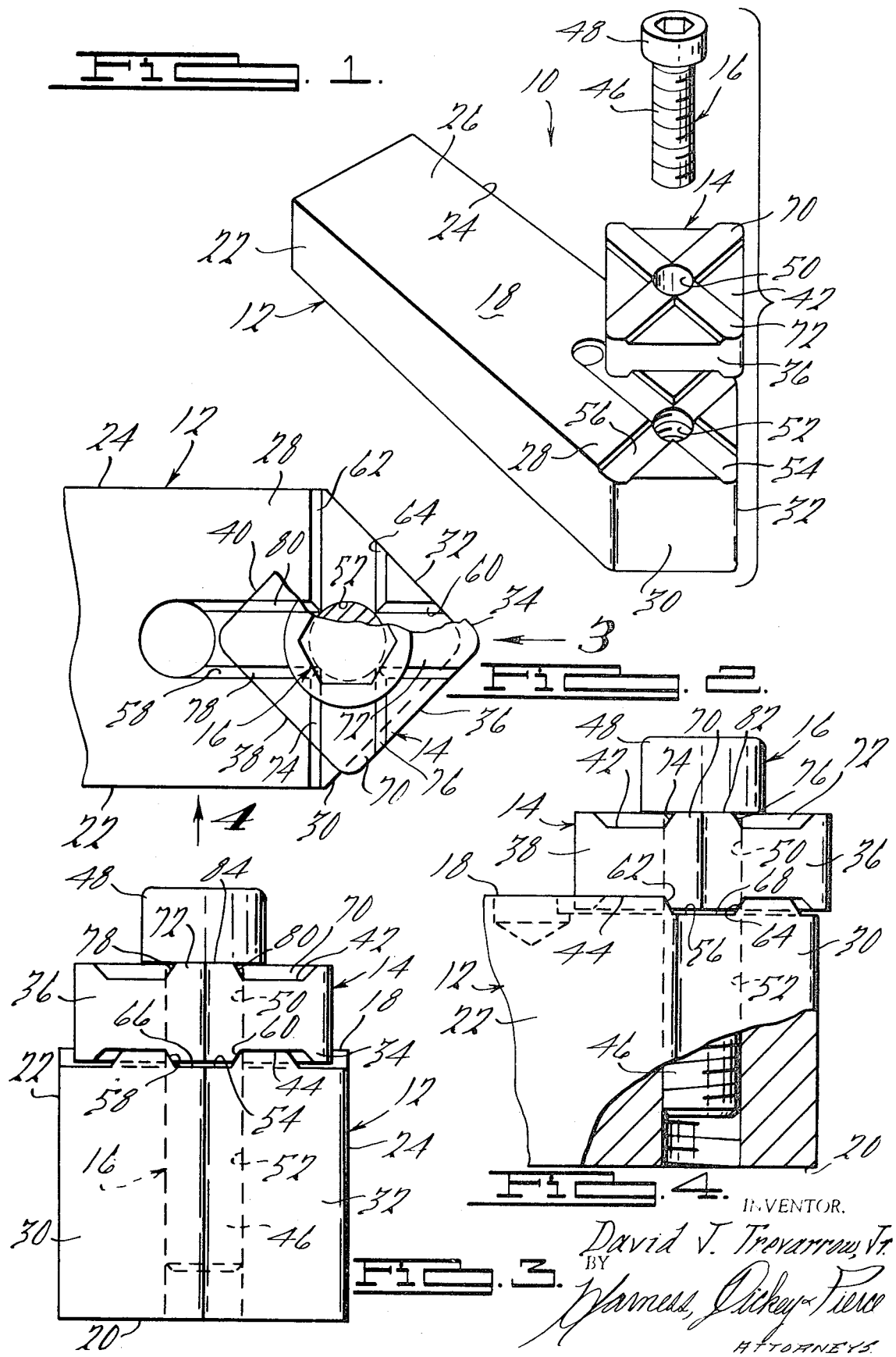

TOOL AND TOOL HOLDER ASSEMBLY

SUMMARY OF THE INVENTION

This invention has reference to tool holders and to cutting tools for use therewith, and it has for its principal object to provide a new and improved tool and tool holder assembly adapted to permit rapid and convenient mounting of the tool on the associated tool member, as well as to provide for positive positioning of the tool on the tool member in some preselected orientation so as to insure against any relative movement of the tool with respect to the tool holder member during a machining operation.

It is another object of the present invention to provide a new and improved tool and tool holder assembly of the above-described type which includes means for accurately positioning the tool, in a preselected orientation on the tool holder member, yet permit a tool to be selectively adjusted such that one or a plurality of different cutting edge portions thereof may be oriented in confronting relationship with the workstock to be machined.

It is another object of the present invention to provide a tool and tool holder assembly of the above character which is of a relatively simple design, is economical to manufacture and is easy to assemble.

It is yet another object of the present invention to provide a new and improved tool and tool holder assembly that will find universality of application.

Other objects and advantages of the present invention will become apparent from the following detailed description taken in conjunction with the accompanying drawing.

BRIEF DESCRIPTION OF THE DRAWING

FIG. 1 is an elevated perspective exploded view of the tool and tool holder assembly of the present invention;

FIG. 2 is an enlarged fragmentary top elevational view, partially broken away, of the tool and tool holder assembly illustrated in FIG. 1;

FIG. 3 is an end elevational view of the apparatus illustrated in FIG. 2, as seen in the direction of the arrow 3 thereof, and FIG. 4 is an enlarged side elevational view, partially broken away, of the apparatus illustrated in FIG. 2, as seen in the direction of the arrow 4 thereof.

DETAILED DESCRIPTION OF THE INVENTION

Referring now to the drawing, a combination tool and tool holder assembly, generally designated by the numeral 10, in accordance with one preferred embodiment of the present invention, is shown generally as comprising an elongated tool holder member 12, a cutting tool member 14 and a connecting or fastening member 16 which is adapted to operatively secure the tool member 14 to the tool holder member 12 in a manner such that the tool member 14 may be fixedly secured in a preselected operative orientation, yet may be conveniently removed and reassembled so that said member 14 assumes the same or a different operative position, as will hereinafter be described in detail.

As best illustrated in FIG. 1, the tool holder member 12 is of a generally elongated configuration and defines generally flat or planar upper and lower spaced parallel surfaces 18 and 20, and longitudinally extending sides 22 and 24. The tool holder member 12 comprises an elongated mounting section 26 adapted to be secured by any suitable means within a suitable tool slide or the like (not shown) as is well known in the art. The end of the tool holder member 12 opposite the mounting section 26 comprises a tool support section 28 and is defined in part by the upper surface 18 of the member 12 and by a pair of transversely inwardly and longitudinally tapered or converging end portions 30 and 32 which intersect along a plane lying along the longitudinal centerline of the tool holder member 12, as is best illustrated in FIG. 2.

The tool member 14 is preferably fabricated of a suitable hardened steel, such as carbide steel or the like and is of a generally square configuration in plan view, with the member 14 having four equal length side sections 34, 36, 38, and 40 arranged at generally right angles to one another and extending between vertically spaced upper and lower generally spaced parallel surfaces 42 and 44, respectively, and defining a plurality of workstock cutting edges therewith. The tool member 14 is adapted to be operatively secured to the tool holder member 12 by the aforementioned fastening means 16 which is preferably in the form of a suitable screw, bolt or the like having an elongated, externally threaded shank section 46 terminating at the upper end thereof in an enlarged diameter head section 48. The bolt or fastening means 16 is adapted to extend through suitable aligned, internally threaded bores 50, 52 formed in the tool member 14 and tool holder member 12, respectively. As best illustrated in FIGS. 1 and 2, it will be seen that the bore 50 is formed in the center of the tool member 14, i.e., at the intersection of imaginary diagonal lines drawn thereon, while the bore 52 is oriented on the member 12 along the longitudinal centerline thereof at a position slightly rearwardly of the converging end portions 30, 32, whereby when the tool member 14 is oriented such that the diagonals thereof extend longitudinally and transversely of the tool holder member 12 and the fastening means 16 is operatively inserted through the bores 50, 52, the marginal edges of two of the adjacent side section 34–40 of the tool member 14 will project outwardly beyond the converging end portions 30, 32 of the tool holder member 12, whereby the outwardly projection marginal edges are adapted for machining engagement with associated workstock, as will be apparent.

In accordance with the principles of the present invention, the tool member 14 principles adapted to be invention, mounted upon the tool holder member 12 in a manner such that any of the side sections 34–40 of the tool member 14 may be oriented in a workstock confronting relationship, yet the tool member 14 will be secured on the tool holder member 12 so that any rotational, longitudinal or transverse movement of the tool member 14 with respect to the tool holder member 12 will be positively precluded. This is accomplished through the novel provision of a plurality of interengageable outwardly projecting embossed portions formed on one of the members 12, 14 and channellike recesses formed on the other of the members 12, 14 with the result that when the embossed portions are nestingly received within the recesses, relative movement of the tool member 14 along a plane parallel to the tool holder member 12 is effectively precluded, as will hereinafter be described.

As best illustrated in FIG. 1, the upper surface 18 of the tool holder member 12 is formed with a pair of intersecting channellike recesses 54 and 56, the latter of which extends transversely or laterally of the member 12 at a position substantially aligned with the intersection of the converging end portions 30, 32, and the sides 22, 24. The channellike recess 54 extends longitudinally of the member 12 at a position aligned with the centerline of the member 12 and intersects the recess 56 at a position laterally aligned with the opening 52, as illustrated. It will be noted that the forward end of the recess 54 is centrally aligned with the intersection of the converging end portions 30, 32, as best seen in FIG. 2. As illustrated in FIGS. 3 and 4 the channellike recesses 54, 56 are formed with downwardly and inwardly tapered side edges 58, 60 and 62, 64, respectively, and with generally horizontally extending lower surfaces 66, 68, respectively, which extend parallel to but are spaced below the plane of the upper surface 18 of the tool holder member 12.

The recesses 54, 56 are adapted to nestingly receive a pair of complementary shaped downwardly projecting embossed portions formed on the lower side 44 of the tool member 14, which embossed portions may, if desired, be provided on both the upper and lower sides 42, 44 of the member 14, whereby to permit inverting the tool member 14 for certain machining applications, as will be apparent. By virtue of the fact that the embossed portions formed on the upper and lower sides 42, 44 of the tool member 14 will be identical in size, shape and function, the same reference numerals will be applied to the embossed portions on both the upper and lower sides 42, 44 for purposes of clarity of description. As best illustrated in FIG. 1, the embossed portions provided on the sides 42, 44 of the tool member 14 are generally designated by the numerals 70, 72 and are arranged so as to extend diagonally between the intersection of the adjacent sides 34–40 of the member 14. That is, the embossed portion 70 extends diagonally of the member 14 so that when said member is oriented in the manner illustrated in the drawing, said embossed portion 70 extends laterally or transversely of the tool holder member 12. Similarly, the embossed portion 72 extends diagonally of the tool member 14 and therefore is arranged at right angles with respect to the embossed portion 70 so that when the tool member 14 is oriented as illustrated in the drawings, said embossed portion 72 extends longitudinally of the tool holder member 12. It will be seen that the portions 70, 72 intersect at the opening 50. The embossed portions 70, 72 are formed with tapered side portions 74, 76 and 78, 80, respectively, which are oriented at a complementary angle with respect to the tapered sides 58–64 of the recesses 54, 56, with the tapered sides 74, 76 and 78, 80 terminating at horizontally extending coplanar surfaces 82 and 84, respectively.

It will be seen that upon operatively mounting the tool member 14 on the tool holder member 12, the tapered sides 74, 76 of the transversely extending embossed portion 70 are adapted to abuttingly engage the tapered sides 62, 64 of the recess 56. Similarly, the tapered sides 78, 80 of the longitudinally extending embossed portion 72 are adapted to abuttingly engage the tapered sides 58, 60 of the channellike recess 54, whereby when the fastening means 16 is operatively secured to the assembly 10, the tool member 14 will be positively secured to the member 12 so that any relative rotational, longitudinal or transverse movement therebetween is effectively precluded. It will be noted that the thickness of the embossed portions 70, 72 and depth of the recesses 54, 56 are designed such that upon operatively mounting the member 14 on the member 12, a slight clearance is provided between the surfaces 82, 84 and the surfaces 66, 68 so as to assure positive locating of the complementary tapered surfaces on the members 12, 14 with respect to one another. At such time as it is desired to orient a different side section 24–40 in confronting relationship with the workstock to be machined, it is merely necessary to slightly loosen or remove the fastening means 16 and thereafter lift the member 14 upwardly from the member 12 so that the embossed portions 70, 72 are clear of the recesses 54, 56 and then rotate the tool member 14 with respect to the tool holder member 12 90°, 180° or 270°, whichever degree of rotation presents the desired cutting edge to the workstock. Thereafter the tool member 14 may be biased downwardly, whereby the embossed portions 70, 72 are again nestingly received within the recesses 54, 56, after which time the fastening means 16 may be properly secured.

It will be seen from the above description that the present invention provides a novel tool and tool holder assembly 10, that will permit effortless and therefore rapid changing or adjusting of the cutting edge used during a machining operation, and that regardless of which cutting edge is oriented in confronting relation to the workstock or forward end of the tool holder member 12, the tool member 14 will be positively secured thereto so as to effectively prevent any relative rotational, transverse or longitudinal movement therebetween. The provision of the complementary shaped nestingly engageable embossed portions 70, 72 and recesses 54, 56 will provide for accurate locating or positioning of the member 14 on the member 12 whenever the member 14 is removed and replaced in the same or in a different orientation. Additionally, by virtue of the fact that the embossed portions 70, 72 may be provided on both the upper and lower sides of the tool member 14, said member 14 may be inverted whenever it is desired to present still additional cutting edges in a workstock confronting position. By virtue of the fact that the assembly 10 is of an extremely simple design, it may economically manufactured, easily assembled and will have a long and durable operational life.

While it will be apparent that the preferred embodiment illustrated herein is well calculated to fulfill the objects above stated, it will be appreciated that the present invention is susceptible to modification, variation and change without departing from the scope of the invention.

I claim:

1. In combination in a tool and tool holder assembly,
    a tool holder member comprising an elongated body having upper and lower sides and converging edge portions defining a tool supporting section,
    said supporting section having a generally planar first engageable surface,
    a tool member adapted to be operatively mounted on said surface and having a cutting portion adapted to overlie said converging edge portions thereof so as to project outwardly therefrom for engagement with a workpiece,
    said tool member having upper and lower generally planar second engageable surfaces adapted to alternately engage said first surface on said supporting section of said holder member upon mounting of said tool member thereon,
    fastening means extending between said members for securing said tool member on said tool holder, and
    means for resisting rotational, transverse and longitudinal movement of said tool member relative to said tool holder member including a pair of generally channellike recess means formed in said first engageable surface of said tool holder member or both of said second engageable surfaces of said tool member, one of said recess means extending longitudinally of said tool holder member and the other of said recess means extending transversely of said tool holder member, and a pair of embossed means formed on the other of said first engageable surface of said tool holder member or both of said second engageable surfaces of said tool member, one of said embossed means extending longitudinally of said tool holder member and the other of the embossed portions extending transversely of said tool holder member, said recess means and said embossed means being of a complementary shape and having tapered mutually engageable side surfaces, and means defining aligned openings at the intersection of said embossed portions and said channellike recesses adapted for reception of said fastening means, whereby said tool member may be selectively inverted upon said holder member and said embossed means may be nestingly engageable within said recess means in either inverted position of said tool member for resisting said relative movement of said tool member with respect to said holder member.

2. In combination in a tool and tool holder assembly,
    a tool holder member comprising an elongated body having upper and lower sides and converging edge portions defining a tool-supporting section,
    a tool member adapted to be operatively supported on said section of said tool holder member and having a cutting portion adapted to overlie said converging edge portions thereof so as to project outwardly therefrom for engagement with a workpiece,
    fastening means for securing said tool member on said tool holder, and
    means for resisting rotational, transverse and longitudinal movement of said tool member relative to said tool holder member,
    said last-mentioned means including first and second channellike recesses formed in said tool-supporting section of said tool holder member, one of said recesses extending longitudinally of said tool holder member and the other of said recesses extending transversely of said member, first and second sets of embossed portions formed on the upper and lower sides of said tool member, one of the embossed portions of each set thereof extending longitudinally of said tool holder member and the other of the embossed portions of each set thereof extending transversely of said tool holder member, said embossed portions and said channellike recesses having tapered mutually engageable side surfaces, and means defining aligned openings at the intersection of said embossed portions and said channellike recesses adapted for reception of said fastening means.

* * * * *